INVENTOR
HARRY R. PAYNE
BY
Cameron, Kerkam & Sutton
ATTORNEYS

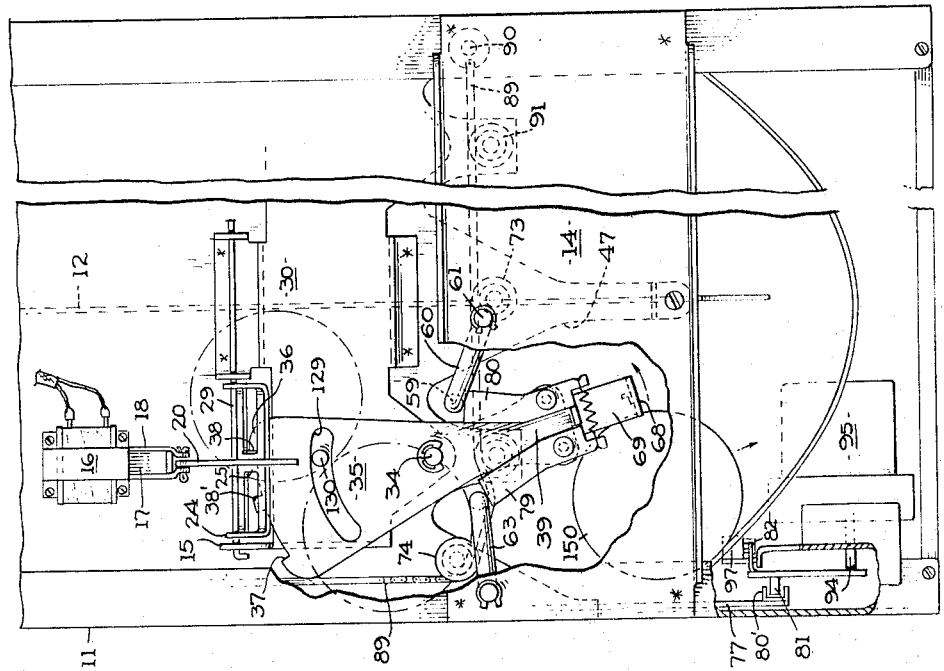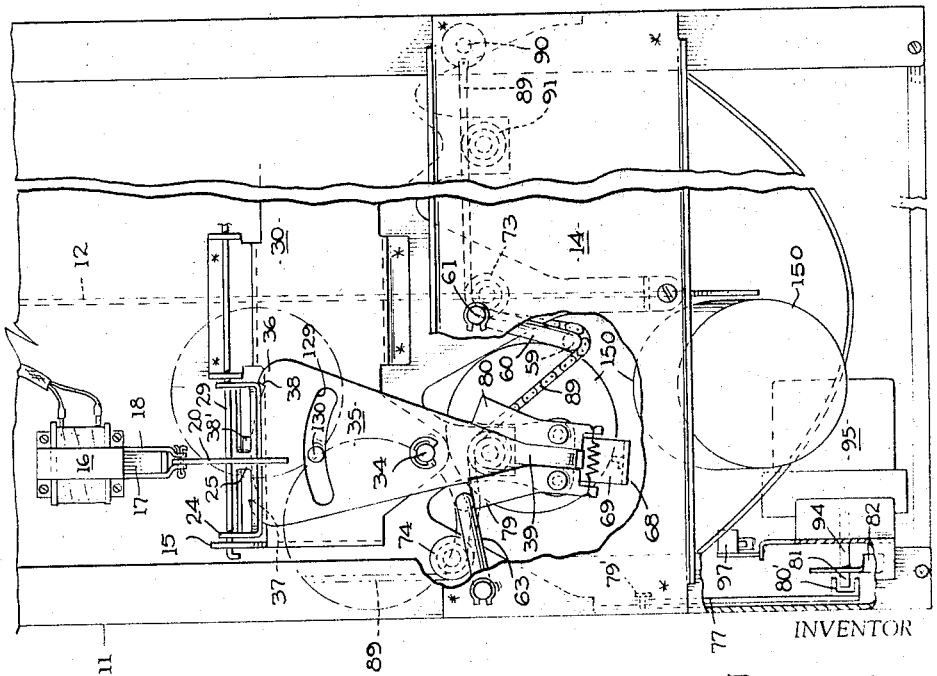

United States Patent Office 3,300,084
Patented Jan. 24, 1967

3,300,084
DISPENSING MECHANISM FOR ARTICLES IN FRONT TO BACK STAGGERED STACKS
Harry R. Payne, Chattanooga, Tenn., assignor to The Seeburg Corporation, Chicago, Ill., a corporation of Delaware
Filed May 25, 1964, Ser. No. 369,674
8 Claims. (Cl. 221—15)

This invention relates to a dispensing mechanism for dispensing a single article at a time in sequence from a plurality of articles arranged in a front to back staggered stack of the type generally disclosed in my copending application Serial No. 286,012, filed June 6, 1963 now U. S. Patent No. 3,224,631 of December 21, 1965.

Even more particularly this invention relates to a mechanism for dispensing a single article at a time in sequence from front to back staggered stacks of articles in which the releasing and dispensing mechanisms are actuated by the weight of the articles in the staggered stacks of articles and release of the releasing and dispensing mechanisms for dispensing a single article at a time from the staggered stack of articles is actuated by electrically energized means.

Even more particularly still this invention relates to a dispensing mechanism for dispensing in sequence and one at a time an article such as a single can or bottle from front to back staggered stacks of articles, cans or bottles, hereinafter referred to for convenience as cans, in which the weight of the cans in the stacks actuates the releasing and dispensing mechanisms. The mechanism is released for the dispensing of a single can at a time by electrically energized means which may be energized from any suitable source and controlled by any suitable switch mechanism which switch mechanism may preferably be actuated by the deposit of a coin.

Even more particularly this invention relates to a dispensing mechanism in which two staggered stacks of cans are arranged in front to back relationship with a releasing mechanism common to both stacks for releasing a can from each stack when the releasing mechanism is energized with one can then being immediately dispensed and the other can being retained until the mechanism is again energized, as by the deposit of a second coin, whereupon the other can is released and dispensed.

At the present time articles such as cans of popular beverages are usually stored for selective sale in refrigerated cabinets with coin release mechanisms for dispensing one can at a time. In these cabinets the cans may be disposed on sloping shelves arranged one shelf above the other or the cans may be arranged in vertical staggered stacks in side by side bins. In the first type of dispenser in which the cans are arranged on sloping shelves the lowermost can on each shelf may move by gravity to a position where it can be withdrawn manually by the purchaser after a coin has been deposited to release a locking mechanism allowing withdrawal of one can at a time.

In the second type of apparatus, in which the cans are arranged vertically in columns in staggered stacks in side by side bins, various devices have been used for releasing one can at a time on the deposit of a suitable coin. Usually this release mechanism is driven by an electric motor and moves from beneath one can in the selected column in the selected staggered stack to a position beneath the next can to prevent more than one can from being dispensed at a time.

The first type of dispenser has advantages of relatively simple construction and the merchandise is visible for selection by the purchaser. A variety of types of beverage can be sold in this machine depending only on a number of sloping shelves provided. This multiplicity of variety is disadvantageous to the supplier who may place the machine on location since the machine can then be used for vending products other than those of the supplier.

In the second type of dispenser in which the cans are arranged in staggered stacks it has been found that the practical size of the cooler, doors and the like of the apparatus limits the number of double column staggered stacks side by side in the cabinet. The number of selections are therefore limited in a machine of maximum size. This is advantageous to the supplier since it limits the number of beverages that can be sold other than those of the supplier. A further advantage is that more cans can be stored in the staggered stack type dispenser than in the shelf type machine. Even greater capacity is obtained when the staggered stacks are arranged in front to back relationship. However, in the staggered stack machine, the delivery mechanism is usually motor-driven; it is expensive; and there is always the possibility of a mechanical jam of the mechanism in the automatic, positive drive of the dispensing mechanism for the cans.

Heretofore, it has been proposed to dispense from stacks of articles or cans less than two diameters of the articles or cans in width with mechanism for holding the lowermost can in the stack first on one side of the stack and then on the other side of the stack. One such proposal is found in U.S. Patent No. 3,107,812 to Harry R. Payne and Jack M. Womack, for Dispensing Mechanism for Articles in Staggered Stack, and owned by the assignee hereof. In the present invention the articles or cans being dispensed move the holding mechanism and particularly the latching portion thereof to the opposite position to support the next cans on the opposite side of the stacks in a plural step lowering of the can to be dispensed. Thereafter one can is immediately dispensed and the other can is held by a support, which is moved when the mechanism is again actuated to release the can for dispensing.

In the dispensing mechanism proposed in the present application the latch is actuated by the weight of the stacks of cans to release the cans to be dispensed and is moved by the weight of the cans to position to latch the support for the opposite and next cans in the stacks, the support for the can retained in the mechanism being locked in can retaining position for release when the mechanism is again actuated.

The dispensing mechanism of the present concept is relatively inexpensive to make, use and service, and permits dispensing at a fast rate without damage to the mechanism. The speed of actuation is advantageous in rush hours, permitting maximum sales. The mechanism of the present concept provides maximum capacity of cans; is simple to service; it eliminates vending errors; and is foolproof in operation.

A regulator may be provided with the mechanism of the present concept of the type described in the copending application of Harry R. Payne, Serial No. 242,539 filed December 5, 1962, now U.S. Patent No. 3,151,770 of October 6, 1964, which returns the can supports to normal and stand-by position.

In the present dispenser, when a coin is deposited or a switch in an electric circuit momentarily closed, a short pulse of electric current passes to the electrically energized means which suffices to actuate this means. This means then lifts a latch which in turn releases a rock plate releasing a support beneath the lowermost cans in the front to back staggered stacks of cans. At the same time the regulator is actuated to provide slack to a non-extensible flexible element beneath the supports. The release support then moves the rock plate out of its path and into position to lock an opposite can support. The descending stacks of cans rotate the opposite can support arm into engagement with the rock plate and continue until the rock plate is rotated to a locked position, preventing further downward movement of the stacks of cans. The release support arm continues to rotate in a downward direction under the weight of the two cans at a rate determined by the regulator. One can only is then dispensed and the other can is retained by a support carried by the rock plate. The lowermost cans thus move with controlled speed toward dispensing position and the stacks of cans move slowly and with controlled speed downwardly until the next can in the stacks of cans engage the opposite can support. Thereafter, the first support is returned to its upper, stand-by and can supporting position by the regulator retensioning the flexible non-extensible element with the rock plate locking the opposite can support against movement. During the upward return movement of the first support, the first support shifts the can retained in the mechanism to the other side of its support. The regulator remains energized after dispensing of the one can and returns to initial position. Thereafter, when the mechanism is again energized, as by the deposit of a coin, the can retained in the mechanism will be released by movement of the rock plate and with it the support carried by the rock plate and the can is dispensed.

This cycle can be repeated as many times as there are cans in the staggered stacks of cans so long as each cycle is started by the deposit of a coin or by the momentary closing of a switch in the electric circuit for the electrically energized means and thereafter the retained can is released by the deposit of another coin or by the momentary closing of the switch in the electric circuit.

The electrically energized or actuated means may be a solenoid, an electric motor or other suitable electrically actuated device for lifting the latch. The regulator is preferably energized by an electric motor in the circuit with the device for lifting the latch and the retained can is released by again lifting the latch.

It is therefore an object of the present invention to provide a novel dispensing mechanism for dispensing one at a time a single article such as a can from staggered stacks of articles or cans in front to back relation which mechanism is actuated by the weight of the cans or articles in the staggered stacks at controlled speed and is released for freeing two articles or cans at a time by electrically energized means actuating a latch with electrically actuated regulator means controlling the dispensing mechanism, one can being dispensed at a time.

Another object of the present invention is to provide such a dispensing mechanism in which the electrically energized means is a solenoid which is momentarily actuated, on the deposit of a coin or by the momentary closing of a switch in its circuit, to raise a latch. This permits a support beneath the lowermost cans in the stacks of cans to swing downwardly under the weight of the cans into engagement with an electrically energized regulator to release the lowermost cans in the two stacks. The next two cans in the stacks engage an oppositely disposed support which prevents those cans from being released and supports all of the remaining cans in the stacks. The mechanism is so arranged that, after releasing two cans, it dispenses one can and holds the second can for dispensing when the mechanism is again actuated. The first support is then returned to its upper position by the regulator which returns to its initial position.

Another object of the present invention is to provide a dispensing mechanism having spaced opposed pivoted supports for alternately supporting the cans in front to back staggered stacks. The weight of the lowermost cans and of the cans thereabove in the stacks is used to move the support adjacent the lowermost cans downwardly into engagement with a stop mechanism which is locked in position by a solenoid actuated latch. This latch is released when the solenoid is momentarily energized, as by the deposit of a coin or by the momentary closing of a switch in the solenoid circuit, to permit the weight of the cans in the stacks to move the adjacent support downwardly into engagement with an electrically energized speed regulator. The stop is moved from beneath the support so that the support may swing to position to release the two lowermost cans at controlled speed with the remainder of the cans then being supported by the new lowermost cans which engage the opposite support. This opposite support is prevented from dispensing movement by the stop. After releasing the cans, the first support is returned to its support position by the regulator as the regulator returns to its initial position. One of the released cans is immediately dispensed and the other released can is held by the mechanism for dispensing when the mechanism is again actuated. The hold mechanism for the held can is controlled by the stop mechanism and is released by the deposit of a coin or by closing the switch in the solenoid circuit.

Other and further objects of the present invention will appear from the following description of an illustrative embodiment thereof.

The illustrative embodiment of the present invention, as described hereinafter, should in no way be construed as defining or limiting the invention and reference should be had to the appended claims to determine the scope of the present inventive concept.

In the accompanying drawings, in which like reference characters indicated like parts:

FIG. 6 is a view similar to that of FIG. 1 with the regulator and support rods in stand-by position and the rock plate in position to dispense the retained can in the front stack;

FIG. 7 is a view similar to that of FIG. 1 with the latch in position after release of the lower right cans and the regulator and support rod in released position with the right front can retained in the mechanism;

FIG. 8 is a view similar to that of FIG. 1 with the mechanism in position for release of the front lower right can which had been moved to lower left position by return of its support rod.

Figure 1:
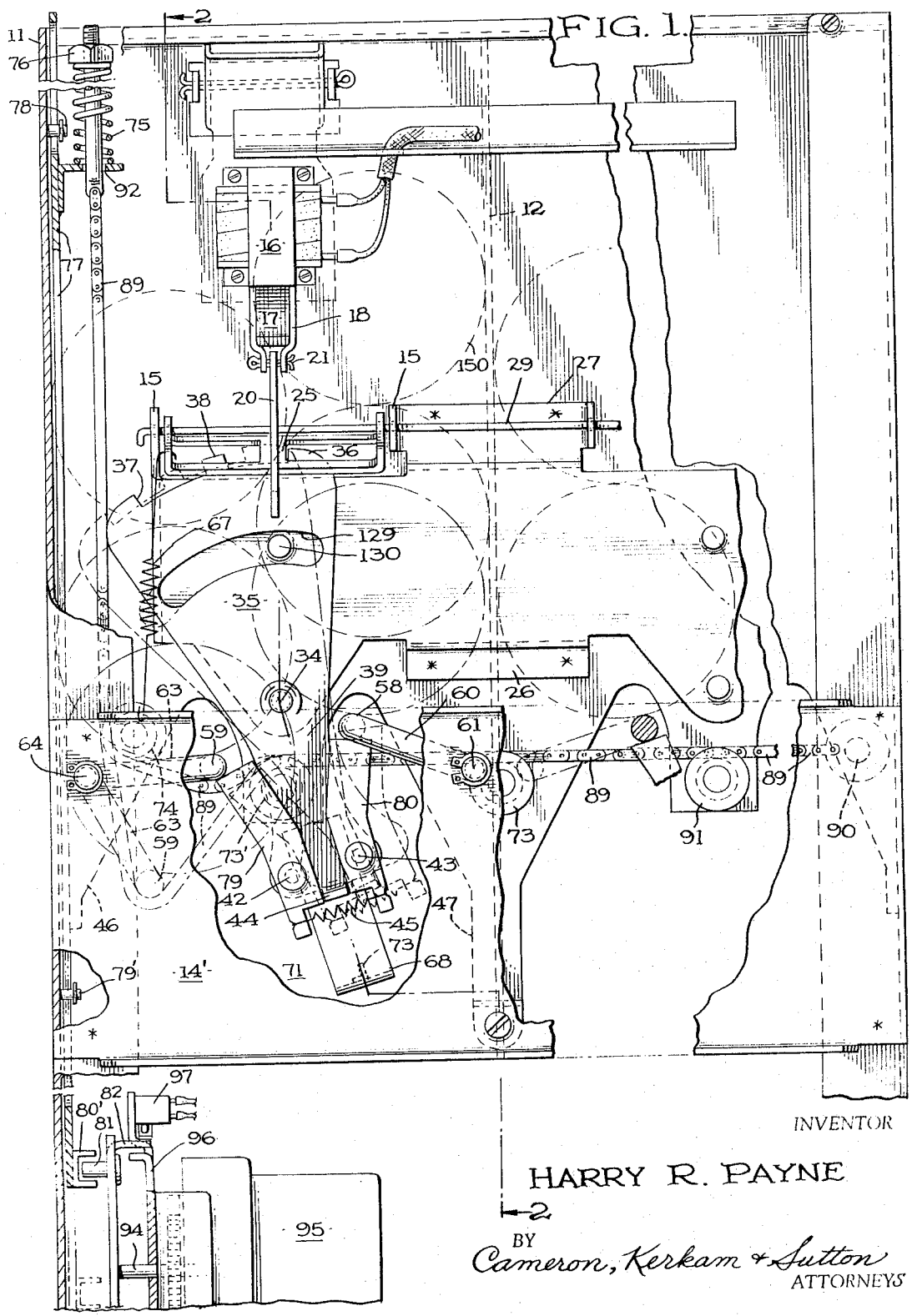
FIG. 1 is a front view of an embodiment of the present invention showing the relative position of the parts thereof with the regulator in its normal or stand-by position and shown in dot-dash line in lowered position.
Figure 2:
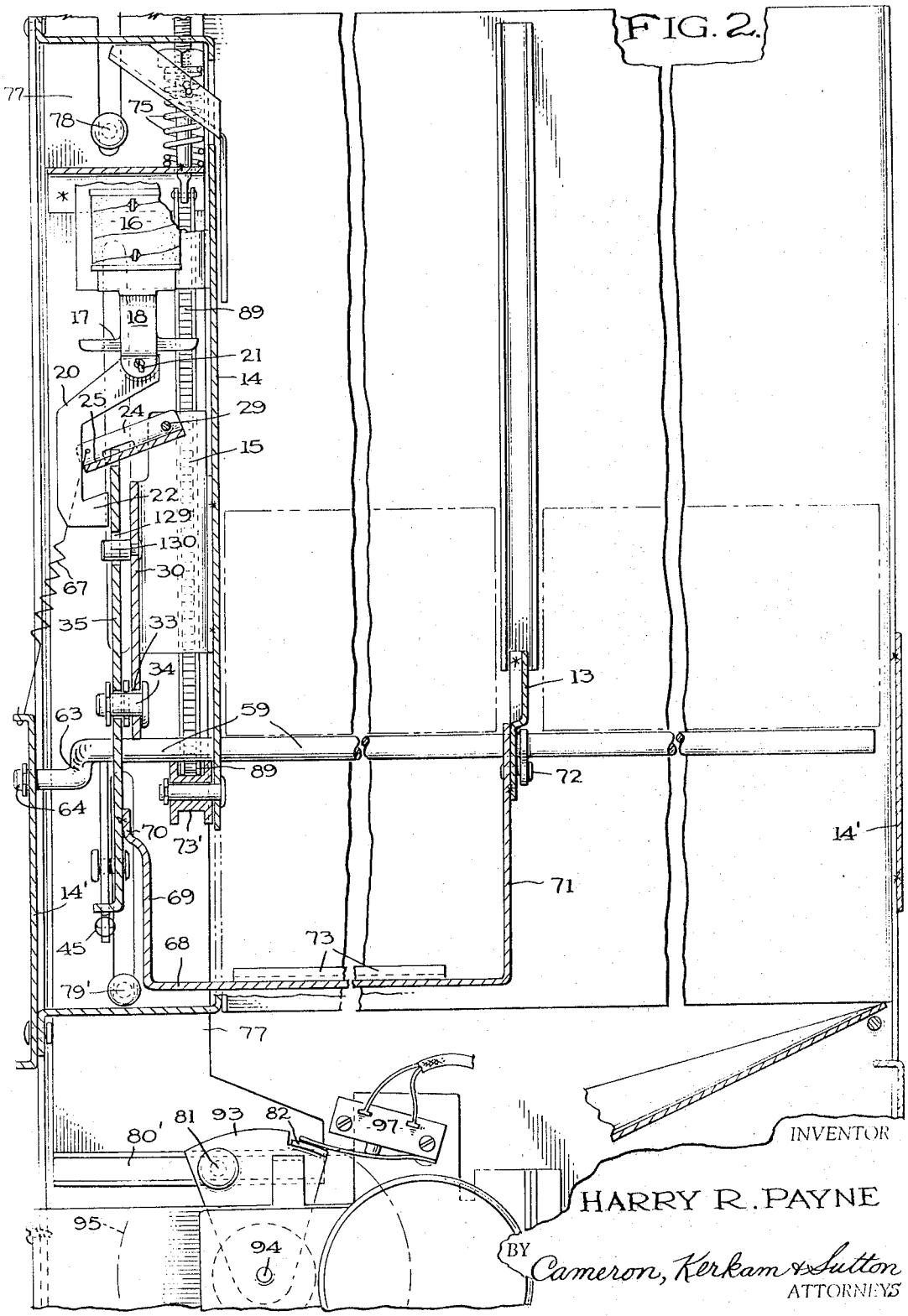
FIG. 2 is a view partly in section of the embodiment of FIG. 1 on the line 2—2 thereof.

Referring now to FIGS. 1 and 2, front to back bins for the staggered stacks of cans are provided having side walls 11 and 12 and a common center wall 13 and front and rear walls 14 and 14'. The side walls of the bins are spaced apart less than twice the diameter of the cans to be dispensed so that the cans will lie between the walls in staggered stacks, in known manner. The front and rear walls 14 and 14' and center wall 13 are spaced to accommodate the lengths of the cans to be dispensed in front to back staggered stacks. Brackets 15 are formed on the central portion of face plate 14. Solenoid 16 which is provided with plunger 17 is mounted on front wall 14. Plunger 17 has a rigid head 18 which in lowermost position lies adjacent to bracket 15. Arm 20 is pivotally mounted on plunger 17 at 21 and has shoulder 22. Arm 20 is provided with a latch engaging shoulder 23 which in its lowermost position lies beneath latch 24 which is pivoted on rod 29 in brackets 15.

Latch 24 has tongue 25 which drops into notches in the rock plate now to be described. A spring 67 may be used to pull latch 24 downwardly.

A face plate 30 has flanges 26 and 27 and is spaced from and is supported on front wall 14. Face plate 30 is bored adjacent its central lower portion at 33 to receive pivot 34 of rock plate 35. An arcuate slot 129 is provided in rock plate 35 in which stop pin 130 is received, pin 130 being mounted on face plate 30 and limits arcuate movement of rock plate 35. Rock plate 35 has an arcuate upper edge 36 which is provided with notches formed by spaced stops 37 and 38 and center stop 38'. In stand-by position tongue 25 of latch 24 lies between stops 37 and 38, or between stops 38' or 38 depending upon the cycle of the mechanism. Rock plate 35 is reduced in width below pivot 35 to form shank 39. Beneath shank 39 rock plate 35 is widened to support tumbler plates 79 and 80. Tumbler plates 79 and 80 are pivoted at 42 and 43, respectively, on shank 39. Shank 39 has out-turned portion 44 separating the tumbler plates. A spring 45 urges the tumbler plates into engagement with portion 44.

In the position shown in FIG. 1, tumbler plates 79 and 80 overlie cut-away portions 46 and 47, respectively, which are let into front wall 14.

A bottle support rod 58 extends the full length of the device being journaled in back 14 and extends through cut-away portion 47. Rod 58 is provided with an arm 60 which is journaled in support plate 14' at 61.

An opposed bottle support rod 59 extends the full length of the device being journaled in back 14 and extends through cut-away portion 46 and is provided with an arm 63 which is journaled at 64 in support plate 14'.

A hold rod 68 is provided with an arm 69 which is secured at 70 to shank 39 beneath the front stack of cans only. Rod 68 extends through cut-away portion 71 in front wall 14 and is mounted for movement therein. Rod 68 is provided with an arm 71 which is pivoted at 72 to partition or center wall 13.

An upstanding stop 73 extends axially on rod 68 for purposes to be described hereinafter.

A flexible non-extensible element such as a chain 89 is fastened to wall 14 at 90 and passes beneath rock plate 35. Chain 89 passes over rollers 91, 73 and 73' and under roller 74, all being mounted for rotation on front wall 14. The other end of chain 89 is secured at 92 through a resilient connection provided by spring 75 and nut and bolt 76 to vertically reciprocable plate 77 mounted on side 11 by pin and slot connectors at 78 and 79'. A horizontal groove 80' is provided at the bottom of plate 77 which is engaged by pin 81 mounted on disc 93. Disc 93 is rotated by shaft 94 of electric motor 95. Motor 95 is mounted on bracket 96 secured to side wall 11. A limit switch 97 is actuated by finger 82 on disc 93, as will appear more fully hereinafter, to de-energize motor 95 after disc 93 has made one complete rotation from and back to the position shown in FIG. 1.

Figure 9:
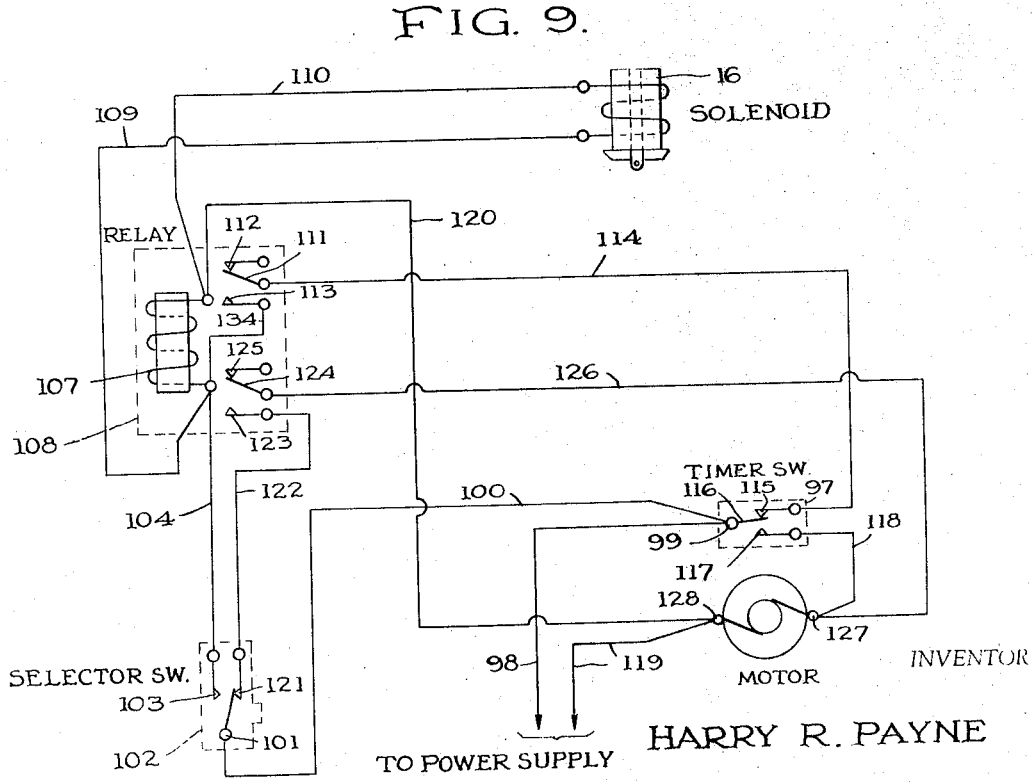
FIG. 9 is a schematic circuit diagram for use with the embodiment of FIG. 1.

Referring now to the circuit diagram of FIG. 9, it will be seen that wire 98 leads from a suitable source of electric power to one side 99 of timer or limit switch 97. Wire 100 leads from side 99 to switch element 101 of switch 102, element 101 being normally in contact with side 121 of switch 102. Side 103 of switch 102 is connected by wire 104 to solenoid 107 of relay 108 and is extended by wire 109 to solenoid 16. The other side of solenoid 16 is connected by wire 110 to the other side of solenoid 107 and by wires 120 and 119 to the source of electric power.

Coil 107 actuates two switch elements 111 and 124 which normally engage open contacts 112 and 125, respectively. Switch element 111 is connected by wire 114 to contact 115 of switch 97. Contact 113 is connected by wire 134 to wire 104. Contact 117 of switch 97 is connected by wire 118 to connection 127 of motor 95. The other connection 128 of motor 95 is connected by wire 119 to the source of electric power.

Switch element 124 is connected by wire 126 to motor connection 127 and, when actuated, engages contact 123 which is connected by wire 122 to contact 121 of switch 102.

Assuming the several switches of FIG. 9 to be in the positions as shown, deposit of a coin in the mechanism to obtain a can of beverage or other goods will move switch element 101 momentarily into engagement with contact 103. Electric current will then flow through wires 98 and 100, switch element 101 and contact 103 and wire 104 to coil 107. Current also flows through wire 109 to solenoid 16 and returns through wires 110, 120 and 119 to the source of electric energy. The circuit for coil 107 is completed to the source of electric energy through wires 120 and 119. Solenoid 16 is energized raising latch 24 which releases two cans, as will appear more fully hereinafter, and relay 108 is energized, moving switch element 111 into engagement with contact 113 and moving switch element 124 into engagement with contact 123.

Current then flows through wires 98 and 100 to switch element 101 and contact 121, switch 102 having returned to its normal position, through wire 122 to contact 123 and switch element 124 and wire 126 to motor connection 127 to start motor 95, the motor circuit being completed through motor connection 128 and wire 119. In the meantime relay 108 is energized through wire 98, switch element 116, contact 115, wire 114, switch element 111, contact 113 and wire 134, this circuit being completed through wires 120 and 119.

Motor 95 then begins to rotate shaft 94 which through disc 93 closes switch 97 to move switch element 116 into engagement with contact 117. The motor circuit for motor 95 is then through wire 98, switch element 116, contact 117, wire 118, connection 127, connection 128 and wire 119. Motor 95 revolves disc 93 through one complete revolution which then moves switch element 116 back into engagement with contact 115. The circuitry is now de-energized, motor 95 stops and relay 108 returns to normal position. In the meantime two cans have been released, one can dispensed and the other can held in the machine, all as will appear more fully hereinafter.

When a second coin is inserted in the machine to obtain another can of beverage switch element 101 of switch 102 is momentarily moved into engagement with contact 103 and solenoid 16 is again energized lifting latch 24 permitting rock plate 25 to move one position allowing the can held in the machine on rod 68 to fall between rod 68 and the adjacent side wall of the bin and be dispensed, as will appear hereinafter. The circuitry has now completed a full cycle and is in condition for the start of another cycle.

Figure 3:
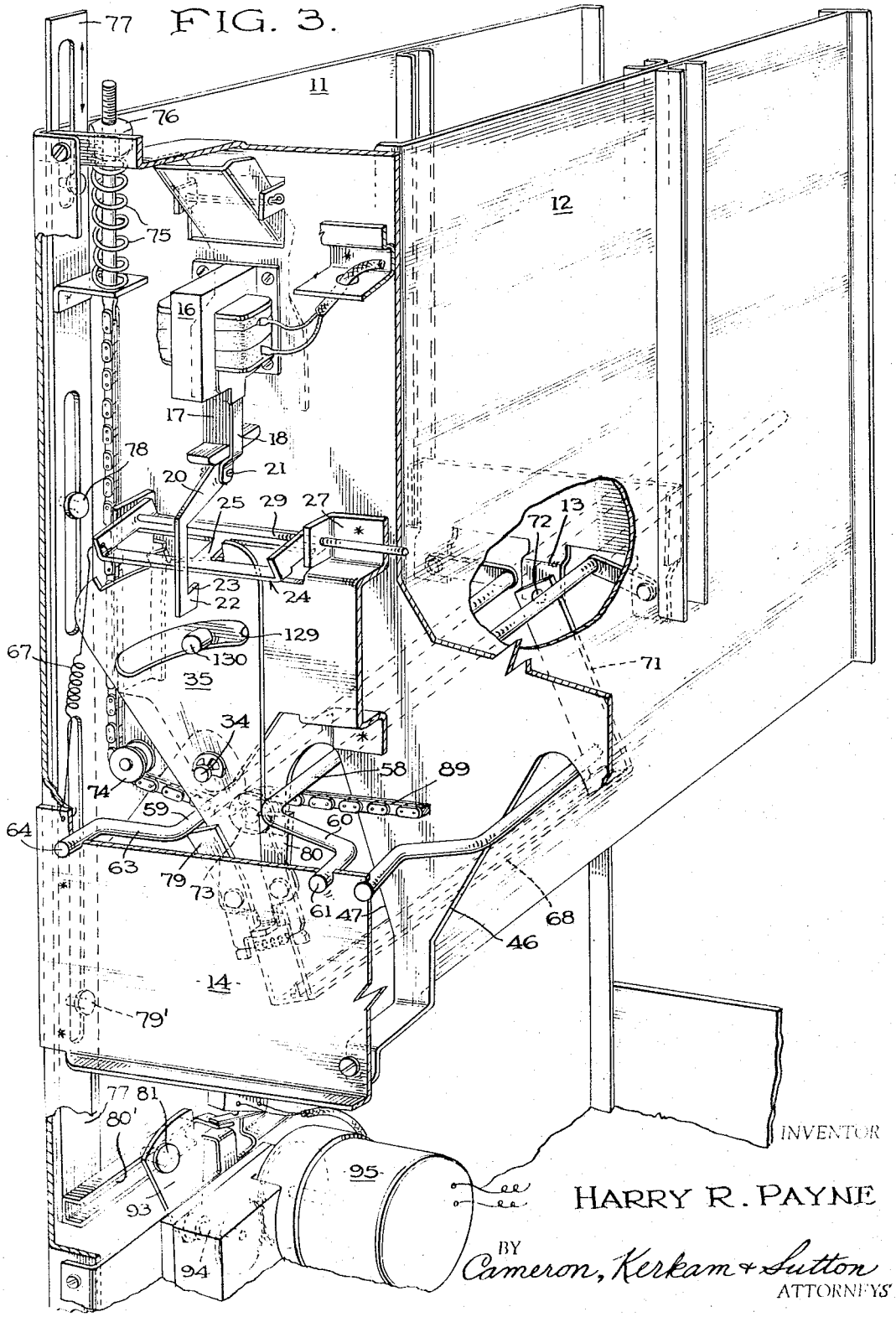
FIG. 3 is a perspective view, partly in section, of the embodiment of the present invention of FIG. 1 with the latch positioned for the support rod for the lower left cans supporting the staggered stack of cans.
Figure 4:
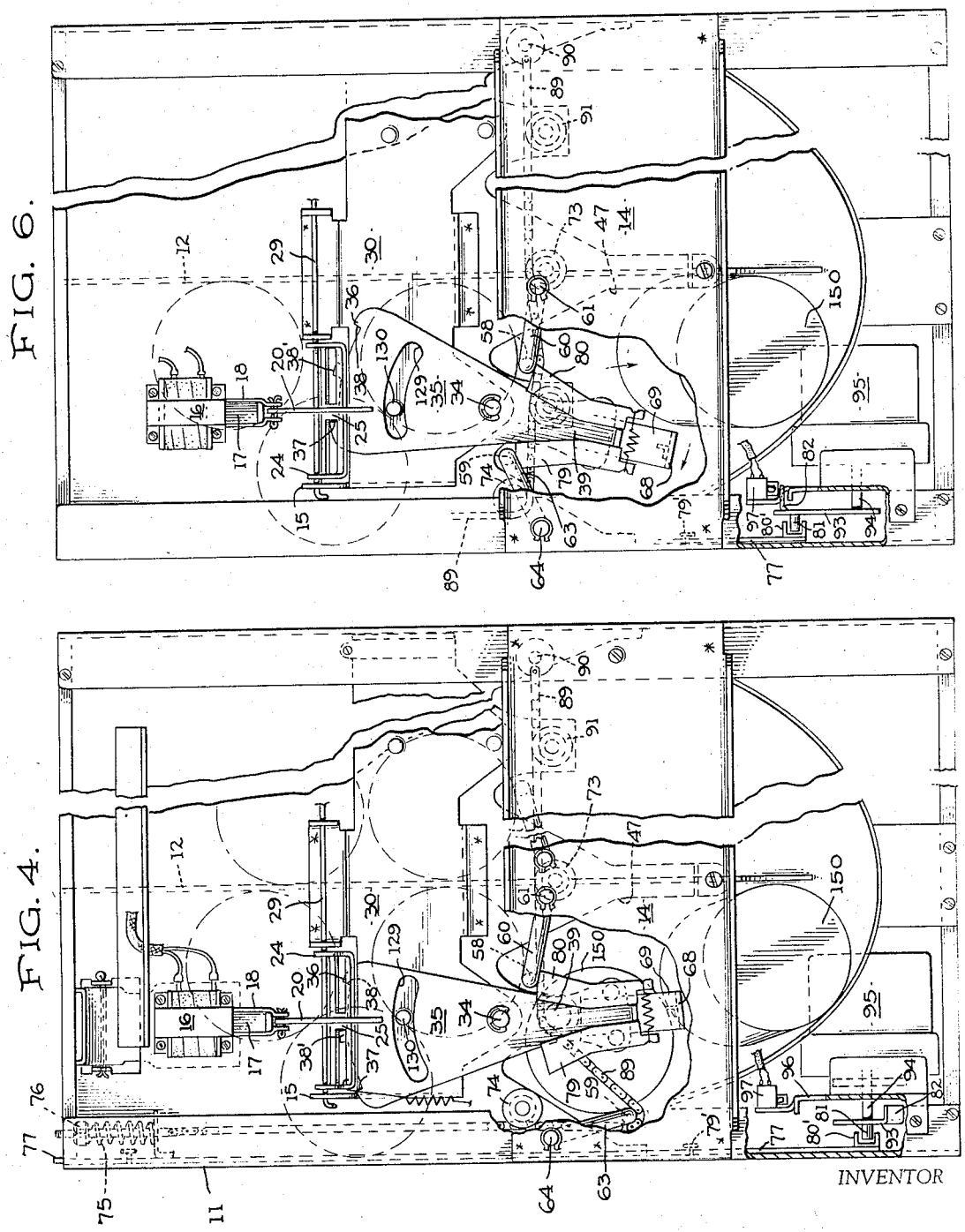
FIG. 4 is a view of the embodiment of FIG. 1 in position releasing the lower left cans with the hold mechanism retaining the lower left can in the front stack.

Referring now to FIGS. 1-6, and with the circuitry of FIG. 9 established and operating as above described, FIG. 1 shows the mechanism in stand-by condition with cans 150 in staggered stack with the lower left cans supporting the stacks of cans and resting on support rod 59. When a coin is inserted in the mechanism, switch 102 is energized, as above described, and solenoid 16 is energized to lift latch 24 and free tongue 25 from the notch in rock plate 35 formed by shoulder 38. The weight of the stacks of cans on rod 59 moves rod 59 downwardly and through tumbler 79 moves rock plate 35 in a counterclockwise direction as seen in these figures so that latch 24 rides momentarily on the right portion of surface 36, rock plate 35 taking the position shown in dot-dash line in FIG. 1 and pin 130 engages the right end of slot 129. At the same time, motor 95 is energized and disc 93 is rotated in a counterclockwise direction as seen in FIGS. 2 and 3 supplying slack to member 89 which permits rod 59, under the weight of the stacks of cans 150, to descend slowly. In the meantime, rock plate 35 has moved into position to support rod 58 which now receives the weight of the stacks of cans rotating rock plate 35 clockwise so that tongue 25 of latch 24 is engaged against the right edge of stop 38', as seen in FIG. 4.

FIG. 4 shows the position of the mechanism when rod 59 has descended to its lowermost position freeing the lower left cans 150 in both stacks. Engagement of tongue 25 of latch 24 with the right side of stop 38' locks rock plate 35 in position and locks support rod 58 in position.

With support rod 59 in its lowermost position, both lower left cans 150 in both stacks are released and the lower left can from the front stack of cans comes to rest on support rod 68 and is supported between rod 68 and wall 11. Rod 68 cannot move because it is a part of and locked with rock plate 35. The lower left can 150 from the rear stack of cans immediately moves to dispensing position because support rod 68 is provided only for the front stack of cans.

Figure 5:
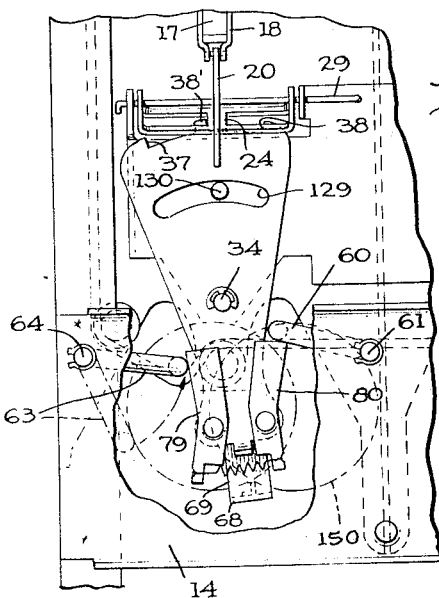
FIG. 5 is a partial view similar to FIG. 4 with the regulator returning the left support rod to its raised and stand-by position with shift of the retained can from left to right on its support bar.

Thereafter, counterclockwise rotation of disc 93 continues and the slack in element 89 is retrieved raising support rod 59 and as shown in FIG. 5, rotating tumbler 79 out of the way and shifting the held can 150 over to position between rod 68 and wall 12, stop 73 on rod 68 preventing the held can from return to its former position. Rod 59 then returns to its normal raised position. At this point switch 97 is opened by disc 93 and the motor circuit is broken and the mechanism comes to rest having dispensed one can.

When the next coin is inserted in the mechanism solenoid 16 is again energized lifting tongue 25 of latch 24 out of engagement with the right side of stop 38'. The weight of the cans on support 58 rotates rock plate 35 clockwise and latch 24 drops, bringing tongue 25 into engagement with stop 37 as in FIG. 6. This rotates rod 68 clockwise and permits the held can to fall between rod 68 and wall 12 and be dispensed.

Motor 93 will be energized and slack will be given member 89 and then retrieved but, since neither supports 58 or 59 were released, this is useful only in providing enough slack in member 89 for the required rotation of rock plate 35.

When the next cycle of operation of the apparatus is begun by the deposit of a coin, it will be noted, as seen in FIGS. 6, 7 and 8, that the lower right cans in each stack rest on rod 58 and support the weight of the stacks of cans 150 in both stacks of cans. Deposit of the coin energizes solenoid 16, as above described, lifting latch 24 and releasing rock plate 35 which is then rotated in clockwise direction, as seen in FIG. 6, and support rod 58 descends in engagement with element 89 with latch 24 momentarily engaging the left side of surface 36 with pin 130 engaging the left end of slot 129. Motor 95 is energized, as above described, and disc 93 starts its single revolotion in counterclockwise direction to provide slack for element 89 which permits support rod 58 to descend. Rock plate 35 is now moved in counterclockwise direction by the weight of the cans on rod 59 and brings tumbler 80 into position to support rod 58 when it returns. Tongue 25 of latch 24 now engages the left side of stop 38' as seen in FIG. 7 and rockplate 35 is locked in position.

As seen in FIG. 7, all available slack has been provided for element 89 and support rod 58 is in its lowermost position permitting the two lower right cans to be released. The lower right can 150 in the rear stack then moves to dispensed position and the lower right can 150 in the front stack rests upon rod 68 and is retained in the mechanism. Motor 95 continues its rotation to complete the single revolution of disc 93 and this rotation of disc 93 retrieves the slack in member 89 which returns support rod 58 to its upper position tripping tumbler 80 during its return. Upward movement of rod 58 also rolls the held can 150 to the left so that it rests on rod 68 against wall 11 in opposite position to that shown in FIG. 5.

When the disc 93 completes its single rotation, switch 97 is actuated and breaks the circuit to electric motor 95 and the mechanism is locked against further dispensing action until another coin is inserted.

When the next coin is inserted, solenoid 16 is energized, as above described, raising latch 24. The weight of the cans resting on rod 59 then swings rock plate 35 in counterclockwise direction, as seen in FIG. 8, until tongue 25 of latch 24 engages the stop 38 and the held can falls between rod 68 and side wall 11 and is dispensed. The mechanism is now locked against further dispensing action and is ready for the next cycle, being in the condition shown in FIG. 1.

It should now be apparent to those skilled in the art that the present invention in every way satisfies the several objectives discussed above.

Changes in or modifications to the above described illustrative embodiment of this invention may now be suggested without departing from the present inventive concept. For example, the concept is not limited to but a single pair of front to back staggered stacks. A plurality of pairs of front to back staggered stacks may be arranged in side by side relationship. Separate electrical circuits can be used with each pair of stacks to provide for selective choice of beverage or other goods in the cans. Only one regulator would be required and it would be actuated during the appropriate portion of the cycle of operations for each stack. FIGS. 1 and 4–8 are broken vertically to indicate the location of additional staggered stacks. Reference should therefore be had to the appended claims to determine the scope of this invention.

What is claimed is:

1. In a mechanism for dispensing a single can at a time from two front to back staggered stacks of cans in a bin, two opposed can supports adjacent the lower end of the bin for said stacks mounted for downward rotary movement from an upper normal position to can releasing position and supporting in turn the lowermost cans of the stacks of cans in the bin, latch means for the supports mounted for oscillatory movement and engaging and holding the support engaged by the lowermost cans in the stacks of cans against downward rotation when the mechanism is in stand-by condition, two notches in said latch means, a latch normally engaged in one of said notches locking said latch means against movement, solenoid means for raising said latch from said notches and thereby releasing said latch means whereby the weight of the cans rotates the support beneath said two lowermost cans in the stacks downward toward can releasing position and moves said latch means beneath the other can support preventing downward rotation thereof, said latch then re-entering said one of said notches, a regulator for control of releasing said cans disposed beneath all of said supports in stand-by position for engagement by said supports, means actuated with the release of said latch for controlled movement of said regulator in the paths of movement of said supports while maintaining engagement between the rotating support and said regulator, means carried by said latch means for retaining one of said released cans in the mechanism, said other released can being dispensed, and said solenoid means releasing the retained can for dispensing when next energized, said latch being raised and then entering the other of said notches.

2. Mechanism as described in claim 1, said regulator comprising a non-extensible flexible element extending beneath said supports, means for securing an end of said element to the bin, said means for controlled movement of said regulator including means for tensioning said element comprising an eccentric, an electric motor rotating said eccentric through one complete revolution, a reciprocable plate engaged by said eccentric, resilient means connecting said element and said plate and circuit means for energizing said motor when said solenoid means is energized.

3. Mechanism as described in claim 1, said retaining means comprising a hold rod supporting the retained can and mounted for movement with said latch means.

4. Mechanism as described in claim 3, including a stop extending axially on said hold rod supporting the retained can against the bin.

5. In a mechanism for dispensing a single can at a time from two front to back staggered stacks of cans in a bin, opposed can supports, means for releasing one of said supports while holding the other of said can supports, for releasing the lowermost cans in the stacks of cans and for dispensing one of said released cans, including a rock plate engaging said can supports, means for retaining the other of said released cans in the mechanism comprising a hold rod secured to said rock plate supporting the retained can between said hold rod and the bin, and solenoid means for actuating said releasing means for a first movement of said rock plate and said hold rod to release the lowermost cans in the stacks of cans and then for a second movement of said rock plate and said hold rod by the weight of the stacks of cans on the other of said can supports to dispense the retained can from said hold rod.

6. Mechanism as described in claim 5, including a stop axially disposed along said hold rod supporting the retained can against the bin.

7. Mechanism as described in claim 5, said hold rod being moved with said releasing means to a position beneath the lowest can of one stack of cans.

8. In a mechanism for dispensing a single can at a time from at least one pair of front to back staggered stacks of cans, opposed can supports, means for releasing one of said supports while holding the other of said can supports for releasing the lowermost cans in one pair of front to back staggered stacks and for dispensing one of said released cans, including a rock plate engaging said can supports, means for retaining the other of said released cans in the mechanism comprising a hold rod supporting the retained can and secured to and movable with said rock plate, and solenoid means for actuating said releasing means for a first movement of said rock plate and of said rod to release the lowermost cans in the stacks of cans and then for a second movement of said rock plate and said hold rod by the weight of the cans in the stack on the other of said can supports to dispense the retained can from said hold rod.

References Cited by the Examiner

UNITED STATES PATENTS

| | | | |
|---|---|---|---|
| 2,585,012 | 2/1952 | Johnson | 221—67 |
| 2,762,524 | 9/1956 | Johnson | 221—67 |
| 2,956,661 | 10/1960 | Radcliffe | 221—67 X |
| 2,988,246 | 6/1961 | Johnson et al. | 221—67 |
| 3,224,631 | 12/1961 | Payne | 221—15 |

ROBERT B. REEVES, *Primary Examiner.*

KENNETH N. LEIMER, *Examiner.*